Patented Nov. 4, 1941

2,261,919

UNITED STATES PATENT OFFICE 2,261,919

MANUFACTURE OF SIRUP

Ernest E. Pittman and Robert Roger Bottoms, Louisville, Ky., assignors to The Girdler Corporation, Louisville, Ky., a corporation of Delaware No Drawing. Application December 30, 1938, Serial No. 248,582

6 Claims. (Cl. 99—142)

This application is a continuation in part of our copending application Serial No. 244,206, filed December 6, 1938. The invention relates to the manufacture of sirup from sugar cane, sorghum, maple sap, and other sugar-bearing materials, and to the production of an improved type of sirup. Heretofore in the manufacture of sirup, lack of uniformity in quality and/or density of the product has been a major problem in the industry. Variations in varieties and conditions of the sugar cane or other type of sugar-bearing materials, incomplete removal of undesirable ingredients from the sugar juices, and inherent limitations in the type of manufacturing processes employed, have all contributed to the problems confronting the manufacturer.

For example, in a common variety of sugar cane, many undesired constituents such as ash, proteins, nucleins, proteoses, amides, amido acids, other organic acids, gums and pectins, fiber particles, fats and waxes, chlorophyll and other coloring materials such as anthocyanin, saccharetin, water soluble polyphenols and tannin-like compounds, and earthy matter are usually found. These collectively are hereinafter referred to as non-sugar ingredients or undesirable ingredients. Ingredients of this character have various deleterious effects on the final product, depending on the amount and kind of such ingredients left in in the process of manufacture. The sirup may have undesirable color and taste characteristics, variations in viscosity, may generate gases after standing, may form cloudy precipitates on standing, or may change in color after a period of time, all of which affect the marketing of the product.

The open type of evaporators heretofore commonly used for the concentration of the sugar juices, has been made necessary since known methods of clarification of the juices have required the substantially continuous or repeated skimming off of the scum during the progressive heating and concentration of the juices. In this type of evaporators there is the ever present danger of scorching the sirup or altering the flavor or color, due to any failure to accurately control the heating; the operation is costly, due to the large expenditure required for heat, time and labor, and the removal of non-sugar ingredients has been effective to only a very limited extent.

Certain canes, such for example as frozen canes, canes which are low in pH, canes grown in certain types of soil, and canes of unusual biological characteristics, such as certain of the Java varieties, could not be used heretofore, due to the fact that the undesirable ingredients are present in large amount and could not be satisfactorily removed by the use of previous types of treatment such as lime, sulphitation, phosphoric acid, etc.

Extensive milling to insure extraction of all of the sucrose has at the same time increased the amount of fine solids in suspension and increased the amount of non-sugars extracted. As certain of the undesirable ingredients could not be satisfactorily removed from the cane juice by prior processes, it has not been feasible to carry the milling operations on the cane as far as the operator might otherwise desire.

This invention has as an object the provision of a process for manufacturing sirup in which the above disadvantages of present processes are eliminated or substantially reduced, and the manufacture of the sirup simplified.

As a further object the invention provides a process of manufacturing sugar cane sirup in which the concentration may be effected in multiple-effect evaporators of either the vacuum or pressure type.

As a further object, the invention provides a process for treating certain sugar-bearing materials which heretofore could not be satisfactorily used for the manufacture of sirup.

Another important object of the invention is the production of a new type of sirup having new and distinctive characteristics, including lighter color, better aroma, milder flavor, and absence of turbidity and nitrogenous matter.

Other objects and advantages will become more apparent as the description proceeds.

As an important feature of the present invention the removal of a very large proportion of the non-sugar ingredients is effected in a very simple and inexpensive manner before there has been any substantial concentration of the juice, instead of during the concentration. Thus low grade canes and too extensive milling no longer present a serious problem, and the concentration is more effectively carried out, because of the absence of the undesirable constituents from the solution being concentrated.

In the manufacture of sirup from sugar cane, the following procedure is given as an example, although the invention is not limited to the details given, or to the use solely of sugar cane.

The juice resulting from the crushing of the sugar cane in the mills is directed to a suitable storage vat, and bentonite slurry is added thereto. The bentonite used forms a stable colloidal suspension in water and the particles will remain in suspension for an indefinite period of time. The bentonite is neither acid nor alkaline in character. As a result of this step there is formed an agglomerate of bentonite and undesirable constituents found in the cane juice, including those which are in solution as well as those in suspension. This agglomerate of bentonite and undesirable constituents of the juice forms in a short period of time, and may be facilitated by thorough mixing or agitating, for instance by air or by mechanical means.

A satisfactory agglomeration will occur if the amount of bentonite by dry weight is about 1/10 of 1% of the weight of the Brix solids in the juice. An excess of bentonite does not harm, and neither does it give any benefit. Too small an amount of bentonite may not give adequate purification.

Preferably we use the bentonite in the form of slurry having about one part bentonite by weight to fifteen parts of water, and which may have been aged for a period of time.

Raw untreated juice is always of acid character. We prefer to treat the raw juice at the same pH at which it is found, but if desired, adjustment of the pH can be made at this or any subsequent stage of the processing. Such adjustment should not be to an extent which will make the juice alkaline or even neutral, because, as is well known in this art, the presence of acids facilitates or accelerates the inversion of sucrose to the desired glucose of sirup.

Following the mixing of the juice and bentonite in the proportion described, the mixture is either heated in the same vessel or delivered to a separating means through any suitable heating means with or without mechanical or other agitation. The heating is preferably to about 190° F., but may be anywhere above, short of the boiling point. It is not necessary to continue the heating for any length of time, and the heat may be shut off as soon as the desired temperature has been reached. The heating flocculates the agglomerate and facilitates separation either in the same vessel or in a separate chamber.

The mixing and heating may be by batches or as a continuous process. Proportioning pumps may deliver the slurry and juice through a mixing device, thence through a heating coil or other means, and thence to the separating means.

We have found that the so called open defecators are well adapted as a separating means, since a relatively short period of time is needed for separation of the agglomerate from the clarified juice, and no additional heat is required at this stage of operation. The agglomerate is usually of a light green color, and contains the bentonite and nitrogenous material, waxes and gums, some of the coloring matter such as chlorophyll, bits of cellulose and other suspended matter, and the like, and will rise to the top of the body of juice as a comparatively thick scum, thus giving gravity separation.

The intimate mixing of the slurry and raw cane juice, together with the agitation occurring in the heaters, enhances the formation of the agglomerate, and the gravity separation taking place in a defecator enhances the separation of the two types of material, since the scum rising toward the top of the liquid bath tends to raise and to filter out of the juice those bits of suspended solids and colloidal ingredients which may actually be heavier than or of about the same specific gravity as the juice itself.

Any suitable method or means for separation of the agglomerate or scum from the clarified liquid may be employed, and if open defecators are used, the clarified liquid may be drained from the bottom of the defecation tank and the scum may be given a suitable later treatment such as passage through a filter press or the like for recovery of any sugar-containing juice remaining therein, or for recovery of any other ingredients thereof. Although separation of juice and agglomerate in a defecator is preferable, we may effect the separation in a filter press or any other type of filtering means, or in a centrifuge.

Since the agglomerate resulting from the rapid and substantially complete removal of undesired constituents from the juice is formed during the mixing of bentonite and raw juice, and is completed during the heating treatment, it is possible to remove substantially all of the agglomerated materials at one time. Since the removal of undesired constituents is effected before concentration, it becomes possible to use closed multiple effect vacuum or pressure evaporators in the concentration of the sirup, which has not heretofore been practical except in the case of sulphitation sirup.

During this concentration to about 50° Brix, a certain cloudiness or turbidity may develop. The sirup should be permitted to stand for about 24 hours, and the solids will settle out without the need for filtering. The sirup from the evaporators, and after settling out of solids in suspension, may then be directed to any suitable final concentrating apparatus in which inversion of sucrose is continued, due to the action of heat and the contained non-volatile organic acids. We prefer to direct the concentrated sirup into a second evaporator means such as an open boiling pan in which the sirup may be heated to an appropriately high temperature until sufficient concentration and resulting inversion has taken place, and until the sirup has the desired density. In this phase of operation the sirup will come to a final content of about 70% solids, and will have a light color and a distinctive, desirable flavor. These characteristics are though to be due primarily to efficient defecation resulting in substantially complete removal of such ingredients as coloring matter, nitrogenous matter, waxes, gums and the like, before concentration.

In the event that it is desired to direct the heated juices to the evaporators before complete removal of undesired constituents has taken place, it is possible to remove any small amount of undesired constituents rising to the surface of the concentrated sirup during the final evaporation stage of operation, thus insuring complete removal of undesired constituents in two stages, in contrast with present day practices of removing the scum gradually as it is formed. From the final stage of evaporation, the sirup may be directly packaged after proper temperature adjustment.

It is found that the sirup made as above described will be substantially free of all undesirable ingredients heretofore mentioned, and will have a comparatively light color and an improved flavor, when compared with commercial sirups made by processes known at present.

Having thus described our invention what we claim as new and desire to secure by Letters Patent is:

1. The method of producing light color table sirup, including the steps of mixing colloidal bentonite capable of dispersion in water and forming a relatively stable colloidal suspension therein, with a sugar-containing juice having substantially its original pH and containing a sufficient quantity of non-sugars to coagulate a stable suspension of colloidal bentonite, thereby rapidly forming a coagulum of bentonite and substantially all of the color forming non-sugar ingredients of the juice, separating said coagulum from the clarified juice before there has been any substantial concentration of the juice, and thereafter concentrating the juice under sucrose inverting conditions to form the light color sirup.

2. The method of producing light color table sirup, including the steps of mixing colloidal bentonite capable of dispersion in water and forming a relatively stable colloidal suspension therein, with a sugar-containing juice having substantially its original pH and containing a sufficient quantity of non-sugars to coagulate a stable suspension of colloidal bentonite, heating the mixture to about 190° F., thereby rapidly forming a coagulum of bentonite and substantially all of the color forming non-sugar ingredients of the juice, separating said coagulum from the clarified juice before there has been any substantial concentration of the juice, and thereafter concentrating the juice under sucrose inverting conditions to form the light color sirup.

3. The method of producing light color table sirup, including the steps of mixing colloidal bentonite capable of dispersion in water and forming a relatively stable colloidal suspension therein, with a sugar-containing juice having substantially its original pH and containing a sufficient quantity of non-sugars to coagulate a stable suspension of colloidal bentonite, thereby rapidly forming a coagulum of bentonite and substantially all of the color forming non-sugar ingredients of the juice, separating said coagulum from the clarified juice by gravity before there has been any substantial concentration of the juice, and thereafter concentrating the juice under sucrose inverting conditions to form the light color sirup.

4. The method of producing light color table sirup, including the steps of mixing colloidal bentonite capable of dispersion in water and forming a relatively stable colloidal suspension therein, with a sugar-containing juice having substantially its original pH and containing a sufficient quantity of non-sugars to coagulate a stable suspension of colloidal bentonite, thereby rapidly forming a coagulum of bentonite and substantially all of the color forming non-sugar ingredients of the juice, separating said coagulum from the clarified juice before there has been any substantial concentration of the juice, and thereafter concentrating, by multiple-effect evaporation, the juice under sucrose inverting conditions to form the light color sirup.

5. The method of producing light color table sirup, including the steps of mixing colloidal bentonite capable of dispersion in water and forming a relatively stable colloidal suspension therein, with a sugar-containing juice having substantially its original pH and containing a sufficient quantity of non-sugars to coagulate a stable suspension of colloidal bentonite, the bentonite being about $\frac{1}{10}$ of 1% of the soluble solids of the juice, thereby rapidly forming a coagulum of bentonite and substantially all of the color forming non-sugar ingredients of the juice, separating said coagulum from the clarified juice before there has been any substantial concentration of the juice, and thereafter concentrating the juice under sucrose inverting conditions to form the light color sirup.

6. The method of producing light color table sirup, including the steps of mixing a colloidal bentonite capable of dispersion in water and forming a relatively stable colloidal suspension therein, with a sugar-containing juice having substantially its original pH and containing a sufficient quantity of non-sugars to coagulate a stable suspension of colloidal bentonite, the bentonite being about $\frac{1}{10}$ of 1% of the soluble solids of the juice, heating the mixture to about 190° F., thereby rapidly forming a thick scum of bentonite and substantially all of the color forming non-sugar ingredients of the juice, separating said scum in an open defecator from the clarified juice before there has been any substantial concentration of the juice, and thereafter concentrating, by multiple-effect evaporation, the juice under sucrose inverting conditions to form the light color sirup.

ERNEST E. PITTMAN.
ROBERT ROGER BOTTOMS.